United States Patent
Ghaemi et al.

[11] Patent Number: 6,016,376
[45] Date of Patent: Jan. 18, 2000

[54] TAPERED COHERENT FIBER BUNDLE IMAGING DEVICE FOR NEAR-FIELD OPTICAL MICROSCOPY

[75] Inventors: Hadi F. Ghaemi, Princeton; Yao Li, Monmouth Jct.; Tineke Thio; Ting Wang, both of Princeton, all of N.J.

[73] Assignee: NEC Research Institute, Inc., Princeton, N.J.

[21] Appl. No.: 09/143,670

[22] Filed: Aug. 31, 1998

Related U.S. Application Data

[60] Provisional application No. 60/061,126, Oct. 6, 1997.

[51] Int. Cl.[7] .................................. G02B 6/04; G01J 4/00
[52] U.S. Cl. .............................. 385/116; 385/12; 385/43; 250/227.18; 250/227.23
[58] Field of Search ............................. 385/43, 39, 116, 385/121, 147, 115, 12, 13; 250/227.14, 227.18, 227.11, 216, 227.2, 227.19, 227.23

[56] References Cited

U.S. PATENT DOCUMENTS

| | | | |
|---|---|---|---|
| 5,146,529 | 9/1992 | Mizutani | 385/103 |
| 5,244,636 | 9/1993 | Walt et al. | 250/227.23 |
| 5,250,264 | 10/1993 | Walt et al. | 422/82.07 |
| 5,272,330 | 12/1993 | Betzig et al. | 250/216 |
| 5,298,741 | 3/1994 | Walt et al. | 250/227.23 |
| 5,320,814 | 6/1994 | Walt et al. | 385/12 |
| 5,361,314 | 11/1994 | Kopelman et al. | 385/12 |
| 5,485,536 | 1/1996 | Islam | 385/12 |
| 5,633,972 | 5/1997 | Walt et al. | 385/116 |
| 5,659,642 | 8/1997 | King et al. | 385/115 |
| 5,664,036 | 9/1997 | Islam | 385/12 |
| 5,709,803 | 1/1998 | Filas et al. | 216/11 |
| 5,789,742 | 8/1998 | Wolff | 250/227.11 |
| 5,796,909 | 8/1998 | Islam | 385/116 |
| 5,953,477 | 9/1999 | Wach et al. | 385/116 |

OTHER PUBLICATIONS

Betzig, E. et al., "Breaking the Diffraction Barrier: Optical Microscopy on a Nanometric Scale," *Science*, vol. 251, pp. 1468–1470 (Mar. 1991).

Paesler, M. A. et al., *Near–Field Optics Theory, Instrumentation, and Applications*, John Wiley & Sons, Inc., Chapter 3, pp. 33–65 (1996).

Pantano, P. et al., "Toward a Near–Field Optical Array, " *Rev. Sci. Instrum.*, American Institute of Physics, vol. 68, No. 3, pp. 1357–1359 (Mar. 1997).

Mogi, M. et al., "Development of Super High Density Packed Image Guide," *SPIE vol. 1067 Optical Fibers in Medicine IV,* pp. 172–176 (1989).

(List continued on next page.)

*Primary Examiner*—Hemang Sanghavi
*Attorney, Agent, or Firm*—Philip J. Feig; Andrew G. Isztwan

[57] ABSTRACT

A subwavelength-resolution optical imaging device is provided for conveying light having a wavelength $\lambda$ that is emitted, reflected or transmitted by a sample. The device comprises a coherent fiber bundle, which itself comprises a plurality of optical fibers disposed substantially coaxially along their lengths. Each optical fiber also comprises a core having an index of refraction $n_1$ and a cladding having an index of refraction $n_2$ thereby providing a value $\Delta$, where:

$$\Delta = \sqrt{n_1^2 - n_2^2}$$

Light is effectively confined within the core of each fiber without need for a separate coating applied to the fibers by selecting the values of $n_1$ and $n_2$ for each optical fiber so as to provide a value for $\Delta$ which permits at least a predetermined fraction of the light launched into each optical fiber at the sampling end of the coherent fiber bundle to be conveyed through the optical fiber to the observation end of the coherent fiber bundle, and which restricts crosstalk between adjacent optical fibers of the coherent fiber bundle to a predetermined level.

19 Claims, 11 Drawing Sheets

OTHER PUBLICATIONS

Buckland, E. L. et al., "Resolution in Collection–Mode Scanning Optical Microscopy," *Journal of Applied American Institute of Physics,* vol. 73, No. 3, pp. 1018–1028 (Feb. 1993).

Ghaemi, H.F. et al, "Fiber Image Guide With Subwavelength Resolution," *Applied Physics Letters,* vol. 72, No. 10, pp. 1137–1139, pp. (Mar. 1998).

Li, Y. et al., "Fiber–Image–Guide–Based Bit–Parallel Optical Interconnects," *Applied Optics,* vol. 35, No. 35 pp. 6920–6933 (Dec. 1996).

Snyder, A. W. et al., *"Optical Waveguide Theory,"* Chapman & Hall, pp. 301–335 (1983).

Betzig, E. et al., "Near–Field Optics: Microscopy, Spectroscopy, and Surface Modification Beyond the Diffraction Limit," *Science,* vol. 257, pp. 189–195 (Jul. 1992).

Pohl, D.W., "Scanning Near–Field Optical Microscopy (SNOM)," *Advances in Optical and Electron Microscopy,* vol. 12, pp. 243–312 (1991).

TAPERED COHERENT FIBER BUNDLE IMAGING DEVICE FOR NEAR-FIELD OPTICAL MICROSCOPY

CROSS-REFERENCE TO RELATED APPLICATION

This application claims the benefit of U.S. Provisional Application No. 60/061,126, filed Oct. 6, 1997.

FIELD OF THE INVENTION

The present invention relates to microscopy, and particularly to a fiber bundle imaging device for use in near-field optical microscopy.

BACKGROUND OF THE INVENTION

Demand for high resolution microscopy and spectroscopy in the visible optical regime has grown at a brisk pace, fueled by both fundamental research and technological developments. With increasing attention focused on the physics and chemistry of microstructures and submicron devices, improved optical devices are required which provide spectroscopic and imagine capabilities at increasingly fine resolutions.

Traditional optical imaging devices are based on so-called "far-field" optics, where the distances between the illumination source, the sample, and the detector are much larger than the wavelength of light is, and a focusing element such as a lens is employed. The resolution of far-field optics is fundamentally limited to the diffraction limit of $\lambda/(2\text{ N.A.})$, where N.A. is the numerical aperture of the focusing lens. As a result, far-field optical imaging devices are ineffective in applications requiring a resolution finer than $\lambda/2$.

Recent developments in increasing the resolution of optical imaging devices have focused on so-called "near-field" optics or near-field microscopy. In near-field imaging, a subwavelength aperture is scanned at a height of a few tens of a nanometer above a sample to be observed, and the intensity of reflected or transmitted light is recorded at each point of the sample. The near-field imaging technique is described, for example, in an article by D. W. Pohl entitled "Scanning Near-Field Optical Microscopy," in *Advances in Optical and Electron Microscopy*, Vol. 12, pp. 243–312 (1991). The size of the aperture is the dominant factor in determining the resolution of a near-field optical imaging device. Near-field optics are employed in near-field scanning optical microscopy ("NSOM"), for example, and can be used to provide finely detailed imaging at resolutions which are finer than half of the wavelength of light used in the device (i.e. "subwavelength resolution").

One common near-field optical imaging device employs a single-mode optical fiber with a tapered tip. The tapered tip of the fiber forms an aperture of about 100 nm at the end, as described in an article by E. Betzig et al. entitled "Near-Field Optics: Microscopy, Spectroscopy, and Surface Modification Beyond the Diffraction Limit," in *Science*, Vol. 257, pp. 189–195 (Jul. 10, 1992). The sides of the tip are coated with a thin metallic film in order to confine the light inside the tip and allow it to exit only from the aperture. The need to metallize the taper arises because the dielectric mode (light) confined in the core of the fiber in the tapered region is not guided efficiently inside the core and has substantial leakage into the cladding. A similar technique is described in U.S. Pat. No. 5,633,972 to Walt et al., in which each of a plurality of imaging fibers is tapered and coated with a thin opaque metal at the tapered end.

Near-field optical imaging devices provide vastly improved resolution in comparison to far-field optical imaging devices. Indeed, among near-field and far-field devices, only near-field optical imaging devices are capable of providing subwavelength resolution. However, conventional near-field optical imaging devices suffer from several drawbacks.

First, due to the very fine resolution of near-field optical imaging devices caused by the narrow fiber tip, only a small area of a sample can be observed by conventional near-field optical imaging devices at any one time. In order to generate an image of a particular area of a sample, the fiber tip of a conventional near-field optical imaging device must therefore be systematically scanned over many discrete points of the desired area, a technique known as "raster scanning." As a result, conventional near-field optical imaging devices require a relatively complex positioning system which is capable of carrying out raster scanning by moving the fiber tip in extremely small increments and positioning the fiber tip within tight tolerances with respect to the sample. Thus, conventional near-field optical imaging devices requiring raster scanning are expensive and difficult to manufacture, especially when large areas (greater than several micrometers) are to be scanned. Moreover, conventional near-field optical imaging devices generate images of sample areas slowly due to the sequential imaging of small, discrete points of sample areas required by the raster scanning technique.

Second, the conventional near-field optical imaging devices described above require special processing to deposit the thin metallic layer at a tapered tip portion of each optical fiber. The application of this metallic coating renders the production of such conventional near-field optical imaging devices more complex and costly, especially given the tight tolerances required for imaging fiber tip apertures which are smaller than the wavelength of light. Moreover, the metallized near-field optical imaging devices of the prior art exhibit limited transmission efficiency because of substantial loss in the tapered region.

Accordingly, what is needed is a near-field optical imaging device that: (a) provides subwavelength resolution; (b) is relatively easy and inexpensive to manufacture in comparison to prior art metalized-tip devices; and (c) provides an enhanced field of view, thereby minimizing the need for raster scanning.

SUMMARY OF THE INVENTION

Generally speaking, in accordance with the present invention, a subwavelength-resolution optical imaging device is provided for conveying light having a wavelength of that is emitted, reflected or transmitted by a sample. The device comprises a coherent fiber bundle, which itself comprises a plurality of optical fibers disposed substantially coaxially along their lengths. Each optical fiber has a first optical fiber end and a second optical fiber end. Each optical fiber also comprises a core having an index of refraction $n_1$ and a cladding surrounding the core having at index of refraction $n_2$ thereby providing a value $\Delta$, where:

$$\Delta = \sqrt{n_1^2 - n_2^2}$$

The coherent fiber bundle includes an observation end comprising the first optical fiber ends which collectively present an observation end face for at least one of introducing conveying an emitting the light. The coherent fiber bundle further includes a sampling end comprising the second optical fiber ends, each second optical fiber end being of reduced diameter in comparison to the first optical fiber end and tapered to present a sampling end face. The core of each optical fiber at the sampling end face has a cross-sectional diameter which is less than or equal to $\lambda$, thereby providing subwavelength resolution.

To effectively confine light within the core of each fiber without need for a separate coating applied to the fibers, the values of $n_1$ and $n_2$ for each optical fiber are selected so as to provide a value for $\Delta$ which permits at least a predetermined fraction of the light launched into each optical fiber at the sampling end of the coherent fiber bundle to be conveyed through the optical fiber to the observation end of the coherent fiber bundle, and which restricts crosstalk between adjacent optical fibers of the coherent fiber bundle to a predetermined level.

Accordingly, a principal object of the present invention is to provide an optical imaging device which provides subwavelength resolution.

Another object of the present invention is to provide a subwavelength resolution optical imaging device based on an array of optical fibers which effectively confines light to the core of each fiber and efficiently conveys the light within the core and along the length of each fiber.

A further object of the present invention is to provide a subwavelength resolution optical imaging device including a plurality of tapered optical fibers each having a subwavelength-sized aperture at the tapered end.

A still further object of the present invention is to provide a subwavelength resolution optical imaging device which effectively confines light to the core of each fiber by means of the characteristics of the core and cladding of the optical fibers comprising the device.

A still further object of the present invention is to provide a subwavelength resolution optical imaging device which effectively confines light to the core of each fiber without the need for a metallic coating applied to the optical fibers comprising the device.

A still further object of the present invention is to provide a subwavelength resolution optical imaging device which provides an enhanced field of view, thereby substantially minimizing the need for raster scanning.

Other objects of the present invention will become more readily apparent in light of the following description in conjunction with the accompanying drawings.

DETAILED DESCRIPTION OF THE PREFERRED EMBODIMENTS

Figure 1:
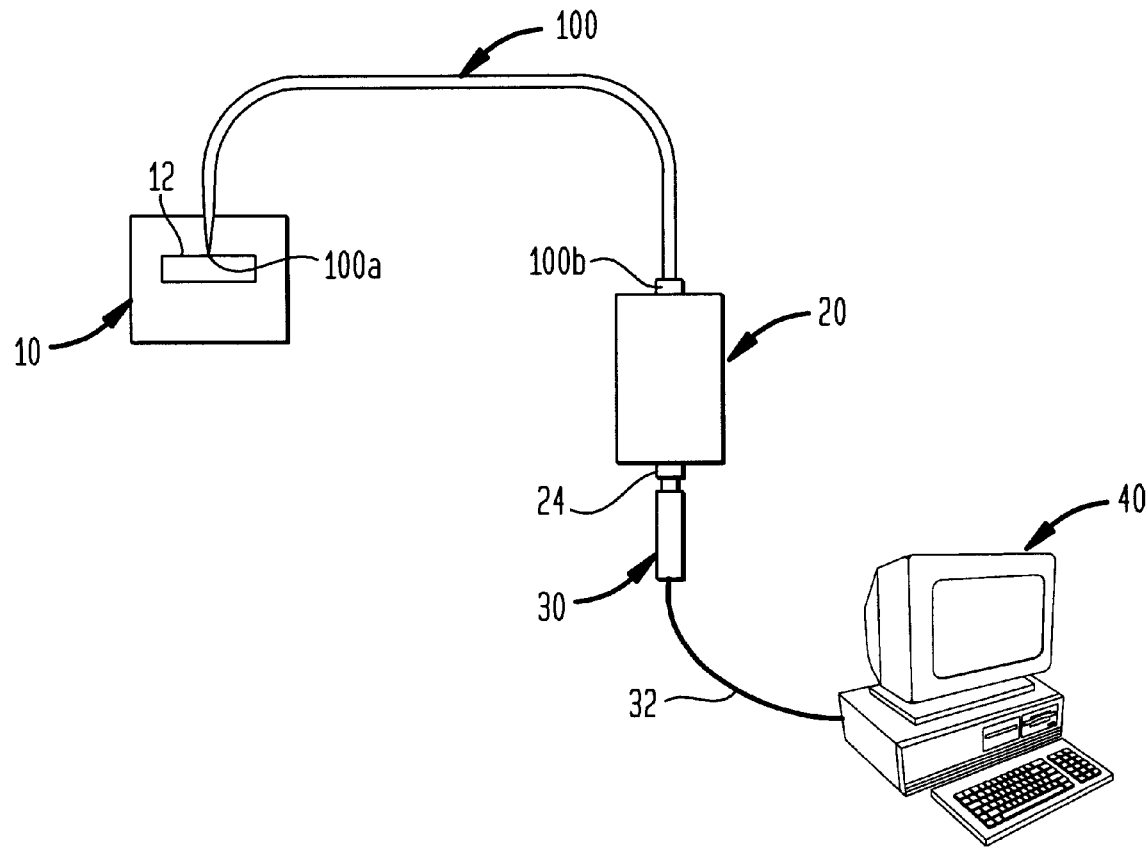
FIG. 1 is a schematic diagram showing a subwavelength-resolution optical imaging device of the present invention as utilized in an exemplary NSOM system.

Referring now to the drawings, FIG. 1 is a schematic diagram showing a subwavelength-resolution optical imaging device 100, hereinafter also referred to as an "imaging bundle," as utilized in an exemplary NSOM system. Generally speaking, the system includes a scan stage 10, a microscope 20, a camera 30 and a monitor 40. Scan stage 10 includes a sample 12 which is desired to be optically imaged at a very high resolution. Imaging bundle 100 generally comprises a coherent bundle of optical fibers, and includes a sampling end 100a and an observation end 100b. The detailed configuration of imaging bundle 100 will be described in more detail below. Sampling end 100a is positioned by a precisely-controlled positioning system (not shown, such as a piezoelectric transducer, so as to be held within the near-field (typically within about 20–30 nm) of a desired portion of the sample to be observed. Observation end 100b of imaging bundle 100 is coupled to an input of a conventional optical microscope 20. The input of camera 30 is coupled to an output of microscope 20 using a camera coupling 24. Finally, the output of camera 30 is coupled to the input of monitor 40 using a camera cable 32.

Microscope 20 may generally comprise any conventional optical microscope. The input of microscope 20 is generally a conventional lens, into which light will be transmitted from sample 12 through imaging bundle 100. The output of microscope 20 is a magnified version of the image presented at the input of microscope 20, and the camera 30 may therefore generally comprise any camera suitable for capturing such an image magnified by the microscope 20. Preferably, camera 30 comprises a CCD camera, although it should be noted that the magnified image output of microscope 20 may comprise an optical or an electrical (i.e. a signal) representation of the magnified image. Camera 30 transmits the magnified image through the camera cable 32 to the monitor 40 for visual display which may or may not be enhanced by additional software or hardware (not shown). It should be noted that the invention is directed to novel imaging bundle 100 and is not to be limited in any way by devices to which the imaging bundle may be connected, such as a scan stage, positioning system, microscope, camera or monitor as described above.

In operation, the NSOM system of FIG. 1 operates as follows. The sample 12 to be viewed is fixed in a mounting (not shown) in scan stage 10. Sampling end 100a of imaging bundle 100 is positioned in very close proximity to the surface of sample 12 to be viewed. In particular, sampling end 100a is placed in the near field of the surface of sample 12. Light which is either transmitted through or reflected by sample 12 is accordingly launched into each of the optical fibers 10 at the sampling end 100a of imaging bundle 100, and is conveyed by the optical fibers of imaging bundle 100 to the observation end 100b of imaging bundle 100, thereby presenting an image at observation end 100b representing the surface of sample 12 near which sampling end 100a is positioned. The multi-point representation of the image created by the plurality of optical fibers comprising the imaging bundle 100 provides an enhanced field of view in comparison to single-fiber devices, and therefore minimizes the need for raster scanning. Microscope 20 receives, magnifies, enhances and otherwise processes the image as desired and is well known in the art. Microscope 20 then transmits the magnified and processed image to camera 30, which in turn records the magnified and processed image and transmits the recorded image to monitor 40 via camera cable 32 for visual display. Accordingly, a magnified, enhanced and/or otherwise processed image of subwavelength resolution appears on monitor 40 which corresponds to the sample proximate to the sampling end 100a of imaging bundle 100.

As described above, the light which is conveyed from sampling end 100a through the imaging bundle 100 to form an image of the sample 12 at observation end 100b may be either transmitted through or reflected by sample 12. As is known in the art, an NSOM system such as that shown in FIG. 1 may operate in two different detection formats: transmission mode and reflection mode, as described, for example, in U.S. Pat. No. 5,633,972 to Walt et al., as well as the article by E. Betzig et al. entitled "Near-Field Optics: Microscopy, Spectroscopy, and Surface Modification Beyond the Diffraction Limit," in *Science,* Vol. 257, pp. 189–195 (Jul. 10, 1992). It will be appreciated to one of ordinary skill in the art that the imaging bundle 100 of the present invention may be used in conjunction with any of the conventionally known detection formats, including transmission and reflection modes.

Figure 2:
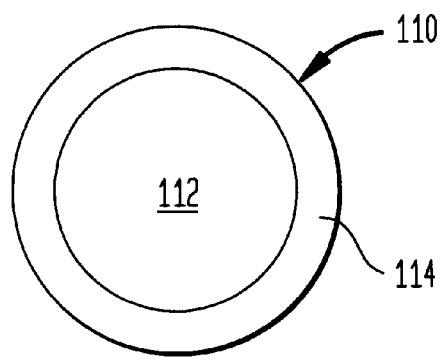
FIG. 2 is an enlarged, cross-sectional view of an optical fiber for use in a subwavelength-resolution optical imaging device of the present invention.

FIG. 2 is a cross-sectional view of an optical fiber 110 for use in the imaging bundle 100 of the present invention. The view of FIG. 2 is highly enlarged; the diameter of an optical fiber 110 suitable for use in the present invention before tapering may be on the order of few microns, but the invention is not limited in any way by the overall diameter of the optical fibers. Each optical fiber 110 includes a core 112 and a cladding 114 surrounding the core. The core 112 and cladding 114 have different indices of refraction. The different indices of refraction of the corn 112 and the cladding 114 allow each optical fiber to guide and convey light within the core 112 of the fiber 110 from one end of the optical fiber to the other. As will be explained below, the particular values of the indices of refraction for the core 112 and cladding 114 play an important role in the invention.

Figure 3:
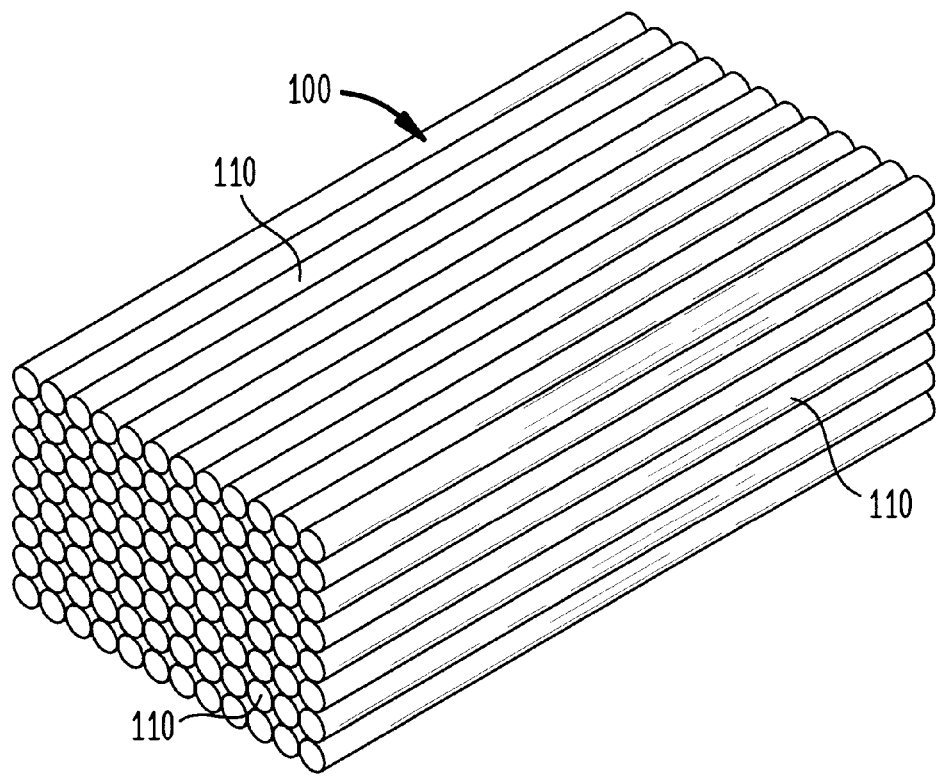
FIG. 3 is an enlarged perspective view, partly in section, of a section of a subwavelength-resolution optical imaging device of the present invention.

FIG. 3 shows a section of imaging bundle 100 in detail. Imaging bundle 100 is a coherent fiber bundle comprising a plurality of optical fibers 110. A coherent fiber bundle is a collection of individual optical fibers disposed substantially coaxially along their lengths that are formed into a bundle such that each fiber appears in the same position on each end face of the bundle. Any desired number of optical fibers may be used in the imaging bundle 100. The fibers of a coherent fiber bundle preferably have thin cladding thicknesses in cross-section. If an image is projected onto one end of the bundle, it will be transmitted through the optical fibers to the other end of the bundle without loss of spatial coherency. The resolution of the image is limited by the diameter of the core 112 of each optical fiber 110, and dark spots appear in the regions occupied by the cladding 114 of the optical fibers 110 (which cladding regions are preferably minimized using thin cladding as noted above). The optical fibers 110 of the imaging bundle 100 are packaged as a relatively large two-dimensional cross-sectional array, preferably in rectangular or hexagonal format (it will be understood that "triangular" and "hexagonal" may be used interchangeably). The imaging bundle 100 of optical fibers 110 can be fabricated using high N.A. (numerical aperture) material pairs in, for example, a single-draw process (for bundles having a relatively low number of fibers, such as several hundred fibers) or a multi-draw process (for bundles having a relatively high number of fibers, such as several thousand fibers or more), as is known in the art.

Figure 4:
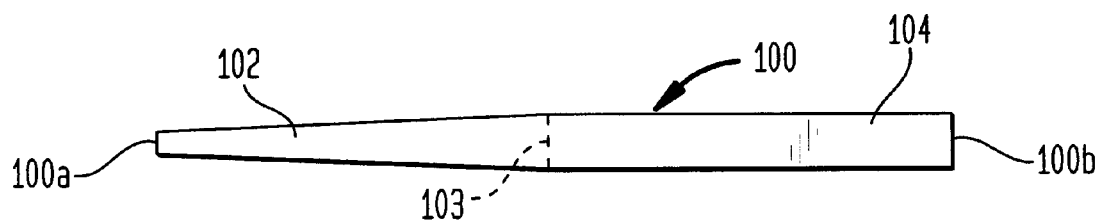
FIG. 4 is a diagrammatic view of the general, overall geometry of a subwavelength-resolution optical imaging device of the present invention.

FIG. 4 is a diagrammatic view of the general, overall geometry of imaging bundle 100. Imaging bundle 100 includes a tapered portion 102 and an untapered portion 104. Tapered portion 102 extends from a predetermined position 103 along the length of imaging bundle 100 to sampling end 100a of imaging bundle 100. Predetermined position 103 may be at any point along the length of imaging bundle 100. Tapered portion 102 is preferably tapered in decreasing cross-sectional diameter from predetermined point 103 to sampling end 100a to present sampling end 100a with a reduced thickness in comparison to the untapered portion 104. As is well known in the art, tapered portion 102 may be constructed by pulling, drawing or extruding the imaging bundle proximate the sampling end 100a, preferably in the presence of heat, thereby allowing the optical fibers 100 to be uniformly tapered (both in the core and cladding of each fiber). The tapering transforms optical fibers having a relatively large core diameter (that is, larger than the wavelength of light to be conveyed through imaging bundle 100) into optical fibers each having a core diameter at the sampling end (hereinafter an "aperture") to be less than or equal to the wavelength of light to be used with the imaging bundle. In this way, a sampling end 100a yielding subwavelength resolution is attained. The untapered portion 104 of imaging bundle 100 extends from predetermined point 103 to observation end 100b. The cross-sectional diameter of observation end 100b is accordingly larger than that of sampling end 100a, which thereby provides a discrete premagnifier of the sample viewed through sampling end 100a, which is particularly useful when he imaging bundle 100 is used in conjunction with a microscope 20 as described above.

The invention is directed to a novel construction of the imaging bundle 100, which is a near-field coherent fiber bundle. The imaging bundle has core diameters at the sampling end 100a that are smaller or comparable to the wavelength of light used and therefore provide substantially improved resolution in comparison to far-field optical devices. The imaging bundle is placed directly in the near-field of the sample, and an intensity map of light that is transmitted through or reflected by the sample into the sampling end, and conveyed through each optical fiber core, will result in a high resolution image at the observation end. The imaged area is determined by the cross-sectional area of the imaging bundle at the tapered, sampling end 100a. This is a significant advantage of the bundle since areas as large as several hundred microns or more can be imaged simultaneously, depending on the overall diameter of the sampling tip 100a. An added advantage is the combined mechanical strength of the bundle of optical fibers in the imaging bundle 100b as compared to a single optical fiber tip as used in some prior art imaging devices. Moreover, the construction of the imaging bundle 100a of the present invention is accomplished without the need for a metallic coating applied to the tapered portion 102 of each optical fiber as in prior art devices. Instead, efficient confinement of light within the core of each optical fiber 100 of the bundle in the tapered portion is accomplished solely by appropriately selecting the characteristics of the core and the cladding of the optical fibers, thereby obviating the complex, difficult and costly procedure of metallizing the delicate optical fiber tips.

In order to eliminate the need for the metal cladding of the tapered portions of the optical fibers as required by prior art near-field optical imaging devices, the light that is launched into each optical fiber must be confined primarily to the core throughout the length of each fiber, from the sampling end 100a to the observation end 100b, including the very thin portion of each optical fiber proximate the aperture of each fiber at the sampling end 100a For this purpose, the modal intensity distribution in a single mode fiber is reviewed, and an optical fiber design is shown which can guide light efficiently within the fiber without a metallic coating even when the fiber is tapered.

Referring again to FIG. 2, a single mode optical fiber 110 is a cylindrical dielectric waveguide comprising a uniform core 112 having index of refraction $n_1$ and a cladding 114 having an index of refraction of n2. The general solutions to the Maxwell's equation for this system are known, as described by A. Snyder et al. in *Optical Waveguide Theory*, Chapman and Hall, London, pp. 301–335 (1983). These solutions are parameterized by the normalized frequency parameter, V, which is defined as:

$$V = 2\pi \frac{\rho}{\lambda} \Delta, \quad \Delta = \sqrt{n_1^2 - n_2^2}$$

where $\rho$ is the radius of the core of the fiber and $\lambda$ is the wavelength of light to be guided by the fiber.

Figure 5:
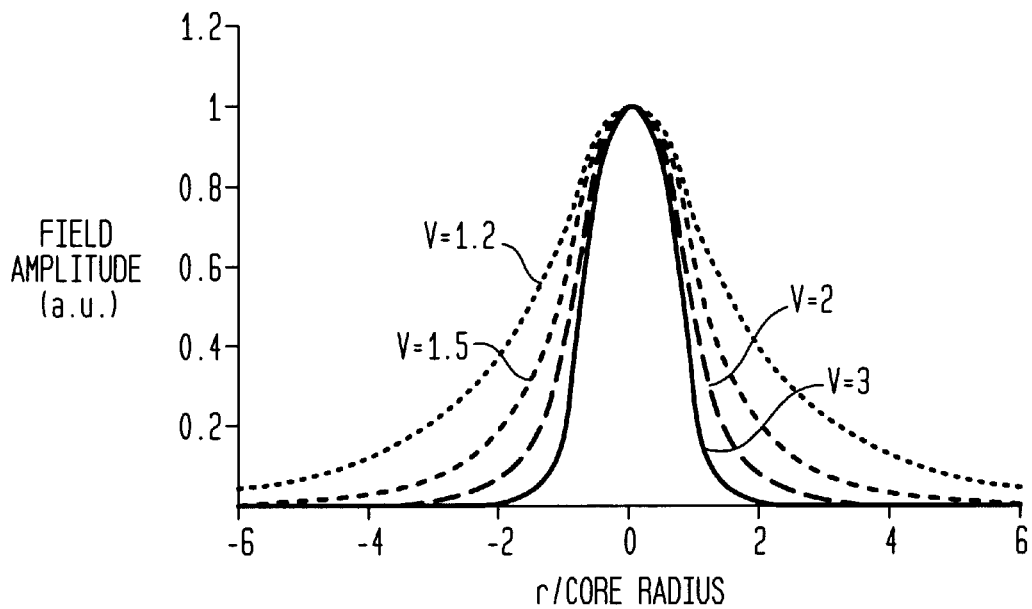
FIG. 5 is a graph showing the electric field distribution inside a single mode optical fiber as a function of normalized radial distance ($r/\rho$) from the axial center of the optical fiber for various values of a parameter V.
Figure 6:
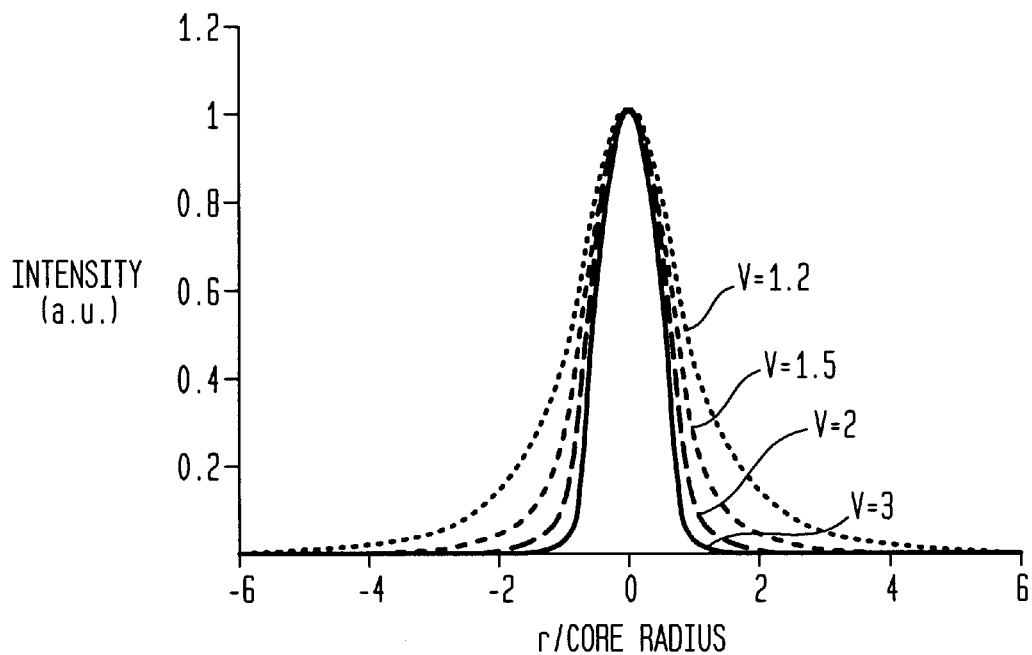
FIG. 6 is a graph showing the intensity distribution inside a single mode optical fiber as a function of normalized radial distance ($r/\rho$) from the axial center of the optical fiber for various values of the parameter V.

FIGS. 5 and 6 respectively show the electric field and intensity distributions inside the single mode optical fiber as a function of normalized radial distance (r/$\rho$) from the axial center of the optical fiber for various values of V, where r is the radial distance from the axial center of the optical fiber and $\rho$ is again the radius of the core of the optical fiber. As is evident from FIGS. 5 and 6, the confinement of light intensity inside the core strongly depends on V. In particular, larger values of V result in stronger confinement, so the optimum optical fiber has a V-value as large as possible. However, a constraint in using a single mode optical fiber is the modal dependency of the fiber on the value of V. Specifically, to maintain a desirable single mode for the fiber, the value of V must be less than or equal to about 2.41. If V exceeds about 2.41, mode mixing will occur, which is undesirable. Accordingly, the preferred single mode optical fiber will exhibit a value of V that is less than or equal to about 2.41.

Figure 7:
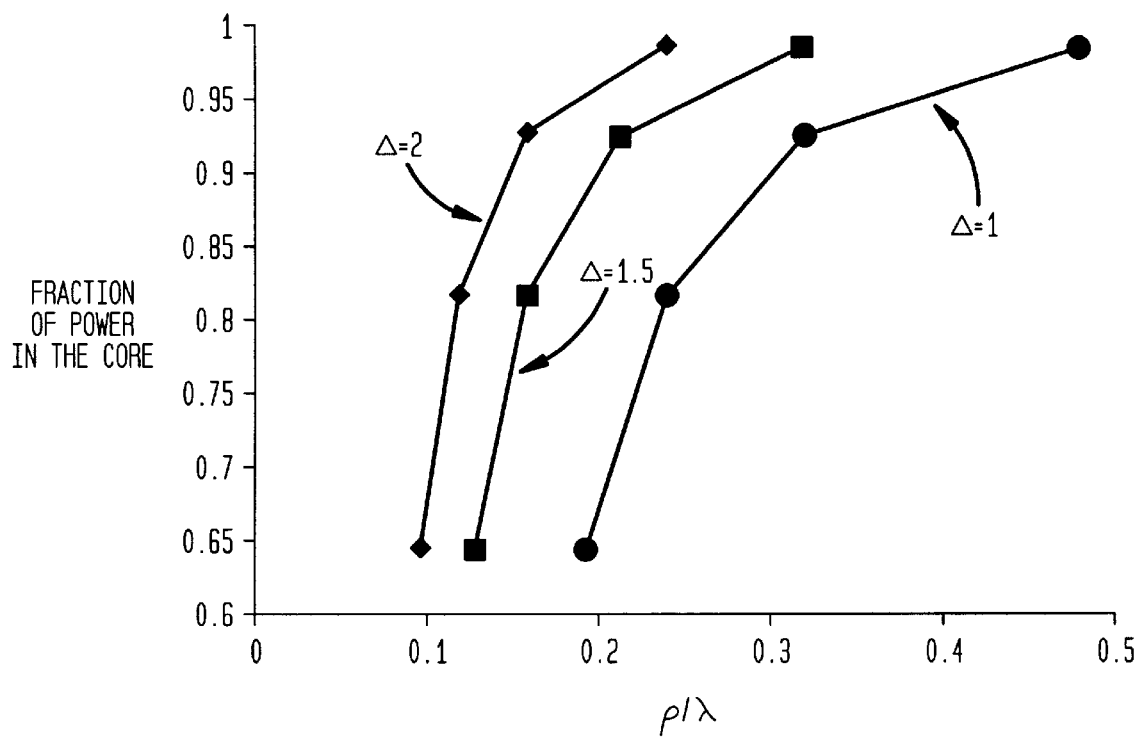
FIG. 7 is a graph showing total intensity as a function of $\rho/\lambda$ for various values of $\Delta$.

To provide an imaging bundle 100 having subwavelength resolution, the diameter of the optical fiber core 112 of each optical fiber 110 must be smaller than or comparable to $\lambda$. Thus, $2\rho/\lambda \leq 1$. Accordingly, to achieve a large V-number so as to efficiently confine the light within the core of the fiber as discussed above, $\Delta$ must be increased. This point is clearly demonstrated in FIG. 7, in which total intensity is integrated and plotted as a function of $\rho/\lambda$ for various values of $\Delta$.

For example, consider a typical single (i.e. not an array), single-mode optical fiber currently used for NSOM tip fabrication. These fibers are weakly guiding, which implies that the difference between the index of refraction of the core $n_1$ and the index of refraction of the cladding $n_2$ is very small. Typical values of $n_1$ and $n_2$ are about 1.4585 and 1.4535, respectively, resulting in $\Delta=0.11$. As demonstrated above, the fraction of power contained in the core is rapidly reduced as $\rho/\lambda$ decreases in the tapered region 102 of the imaging bundle. Thus, a great fraction of light intensity is inside the cladding and is not efficiently guided within the fiber. For this reason, prior art devices have relied on the introduction of a metallic cladding in the tapered region to prevent intensity loss, as well as to limit the illuminated area of the sample to the area of the aperture.

In the imaging bundle 100 of the present invention, the metallic cladding is not needed. Instead, the values of $n_1$ and $n_2$ for the optical fibers 110 are selected so as to permit at least a predetermined fraction of the light having a wavelength $\lambda$ launched into each optical fiber at the sampling end of the imaging bundle 100 to be conveyed through the optical fiber to the observation end of the coherent fiber bundle without creating crosstalk between adjacent optical fibers of the coherent fiber bundle. Crosstalk is light that leaks from the core of one fiber through that fiber's cladding and into an adjacent fiber. Crosstalk is highly undesirable because it distorts at the observation end the true relative intensity of light entering the imaging bundle at the sampling end. Crosstalk is avoided by ensuring that the light launched into each optical fiber 110 at its aperture is appropriately confined within the core of that optical fiber 110 along its length. This guarantees that the resolution of the image obtained by the imaging bundle 100 is truly determined by the core size of each fiber.

Thus, as another example, if the tapered region 102 of the imaging bundle 100 were constructed from an optical fiber 110 having core and cladding indices of refraction of $n_1=1.9$ and $n_2=1.5$, respectively, then the intensity loss in the core will be minimized. For this case, $\Delta=1$, and from FIG. 7 it can be seen that more than 90% of the power remains in the core in the tapered region for core sizes as low as $\rho/\lambda=0.3$. For an illumination source with $\lambda=630$ nm, this corresponds to a core diameter of 378 nm. For higher values of $\Delta$, smaller core diameters may be attained which continue to provide the specified 90% retention of light within each optical fiber core.

The selection of the values of $n_1$ and $n_2$ with respect to the wavelength $\lambda$ of light to be used to achieve an imaging bundle 100 of the present invention having subwavelength resolution will now be described. First, a wavelength $\lambda$ of light to be conveyed through the imaging bundle is selected. Next, a desired fraction of light intensity to be contained inside the core of each optical fiber 110 is selected. Finally, given the wavelength and desired fraction of light intensity, the indices of refraction $n_1$ and $n_2$ are selected so as to permit the desired intensity of light at wavelength $\lambda$ to be contained within each optical fiber core 112 in accordance with the relationships described above. It will be appreciated that a range of values for $n_1$ and $n_2$ will satisfy these relationships in most cases. Finally, to minimize crosstalk between adjacent optical fibers 110 within the imaging bundle 100, at a given minimum core separation (distance between adjacent optical fiber core centers), a particular value of $\Delta$, which is expressed solely as a relationship between $n_1$ and $n_2$ as described above, is chosen.

Figure 8:
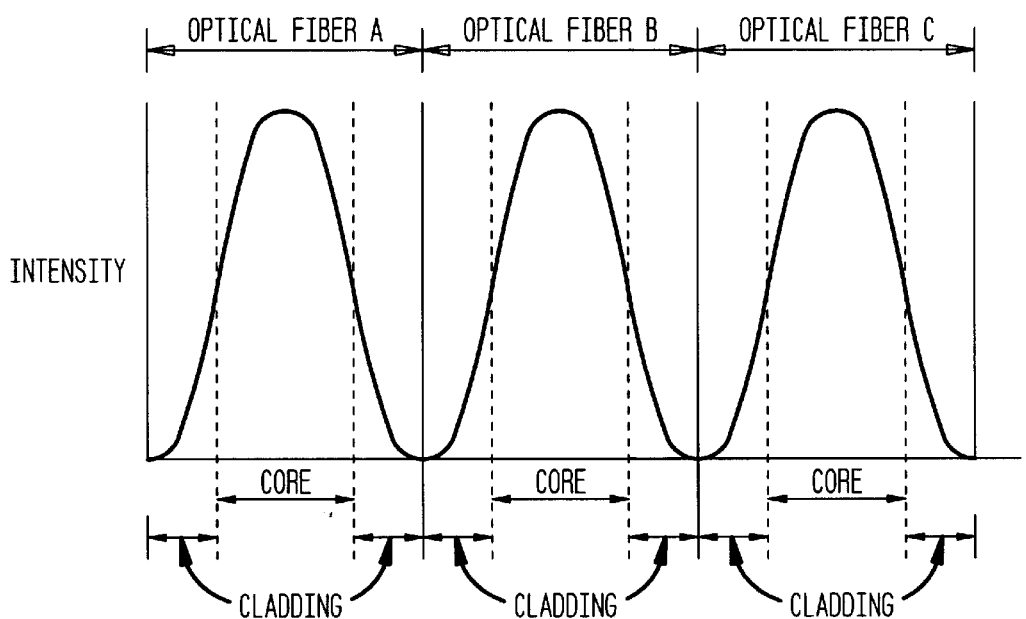
FIG. 8 is a diagram showing intensity distribution within the cross-section of three adjacent optical fibers, Optical Fiber A, Optical Fiber B and Optical Fiber C, in a subwavelength-resolution optical imaging device of the present invention.

The relationship between the characteristics to be selected and their effect may be better understood with an example and reference to FIG. 8. FIG. 8 is a diagram showing intensity, distribution within the cross-section of three adjacent optical fibers 110 in an imaging bundle 100: namely, Optical Fiber A, Optical Fiber B and Optical Fiber C. The borders between adjacent fibers are depicted as solid vertical lines, while the borders between the core and cladding within a particular optical fiber are depicted as broken vertical lines. The intensity distribution inside the core of each fiber is a Gaussian distribution whose width (that is, the point where the intensity drops to lie of the maximum) is determined by the indices of refraction of the core, $n_1$, and the cladding, $n_2$. The fraction of power contained in the core corresponds to the integral of this Gaussian distribution, integrated over the core of the fiber. Therefore, to maintain the power most efficiently in the core, the width of the intensity distribution is set to be equal to or smaller than the core diameter by appropriately selecting $n_1$ and $n_2$. Next, in order to minimize crosstalk, the separation between adjacent fibers in the imaging bundle is increased until the overlap between the corresponding Gaussian distribution is at an acceptable level (i.e. a desire d minimum).

Referring again to FIG. 1, a schematic diagram showing an imaging bundle 100 of the present invention as utilized in an exemplary NSOM system is shown. The imaging bundle 100 of the present invention is inserted between the sample 12 and the microscope 20. The optical fibers 110 of the imaging bundle 100 are tapered such that the ratio of individual fiber core diameters at the sampling end 100a ($d_i$) and the observation end 100b ($d_o$) of the imaging bundle 100 is $r=d_o/d_i$. This imaging bundle can serve as a discrete pre-magnifier of the microscope 20 as discussed above. Using Snell's law, the input and output numerical apertures ($NA_i$ and $NA_o$, respectively) of such a bundle are related by $NA_i d_i = NA_o d_o$.

Figure 9:
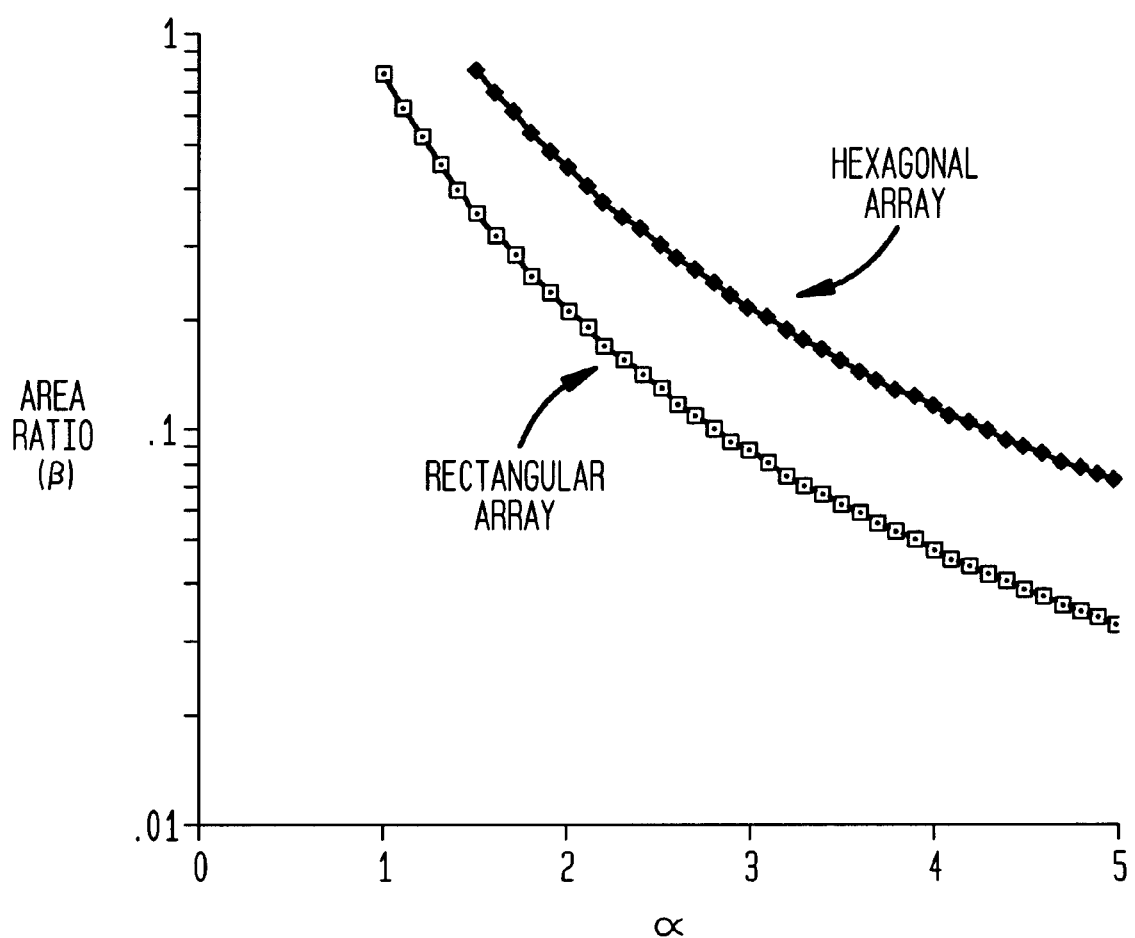
FIG. 9 is a graph showing the relationship between an area ratio $\beta$ and a parameter $\alpha$ for rectangular and hexagonal fiber bundle packaging.

A large taper ratio can relax the imaging requirement of the microscope. However, since a fiber bundle is formed by discrete components, several consequences must be noted. First, the power efficiency of the bundle will not be higher than the geometric area ratio $\beta$ between total core area vs. entire bundle cross-section area. Assuming that a minimum inter-core distance (distance between cores of adjacent fibers in the imaging bundle) of c is required for each fiber, and each fiber has a diameter d, and by defining $\alpha=c/d$, this area ratio will be $\beta \approx \pi/(4\alpha^2)$ for rectangular bundle packaging and $\beta \approx \pi/[(\sqrt{3})\alpha^2]$ for hexagonal bundle packaging. The selection of $\alpha$ is determined by the required output signal-to-noise ratio which depends on the quality of fiber materials, the fabrication process and the length of the fiber bundle. The value $\alpha=2$ implies a cladding layer as thick as the core diameter. In FIG. 9, the relationship between the area ratio $\beta$ and the parameter $\alpha$ is plotted for rectangular and hexagonal packaging formats.

Each individual fiber in the imaging device of the present invention has a much higher power efficiency than prior art metallic-coated NSOM tips, and that the present invention therefore exhibits better performance than prior art NSOM fiber bundles. However, it will be understood that the overall brightness of any fiber bundle-transmitted image will be lower than that of a corresponding conventional analog microscope image. This is due to the fact that light is transmitted in a fiber bundle only through each fiber core, thereby leaving dark spots in the regions occupied by the cladding, whereas a conventional analog microscope transmits light throughout the entire field of view.

Another effect of using such a bundle is the background noise generated by light transmitted through cladding layers, which at the input (sampling) end typically contains more than half of the total light. Since cladding layers are not intended to guide light, the noise from cladding layers at the output (observation) end depends on the length of the imaging bundle. For this reason, it is preferable to bend the imaging bundle slightly to further eliminate this noise. Bending the imaging bundle causes light in the cladding of the fibers to "die" (i.e. become absorbed in the cladding or leak out of the bundle entirely) more rapidly.

A still further effect of using an imaging bundle is that discrete optical fiber components do not form a full-resolution image defined by the fiber cores. To obtain the entire image, multiple scans are required. However, instead of scanning the entire image using a single optical fiber tip, scanning using the imaging bundle comprising a plurality of optical fibers only requires that the area enclosed by four adjacent comer fibers defining the smallest parallelogram in the bundle in either packaging case (rectangular or hexagonal) need be scanned.

Figure 10A:
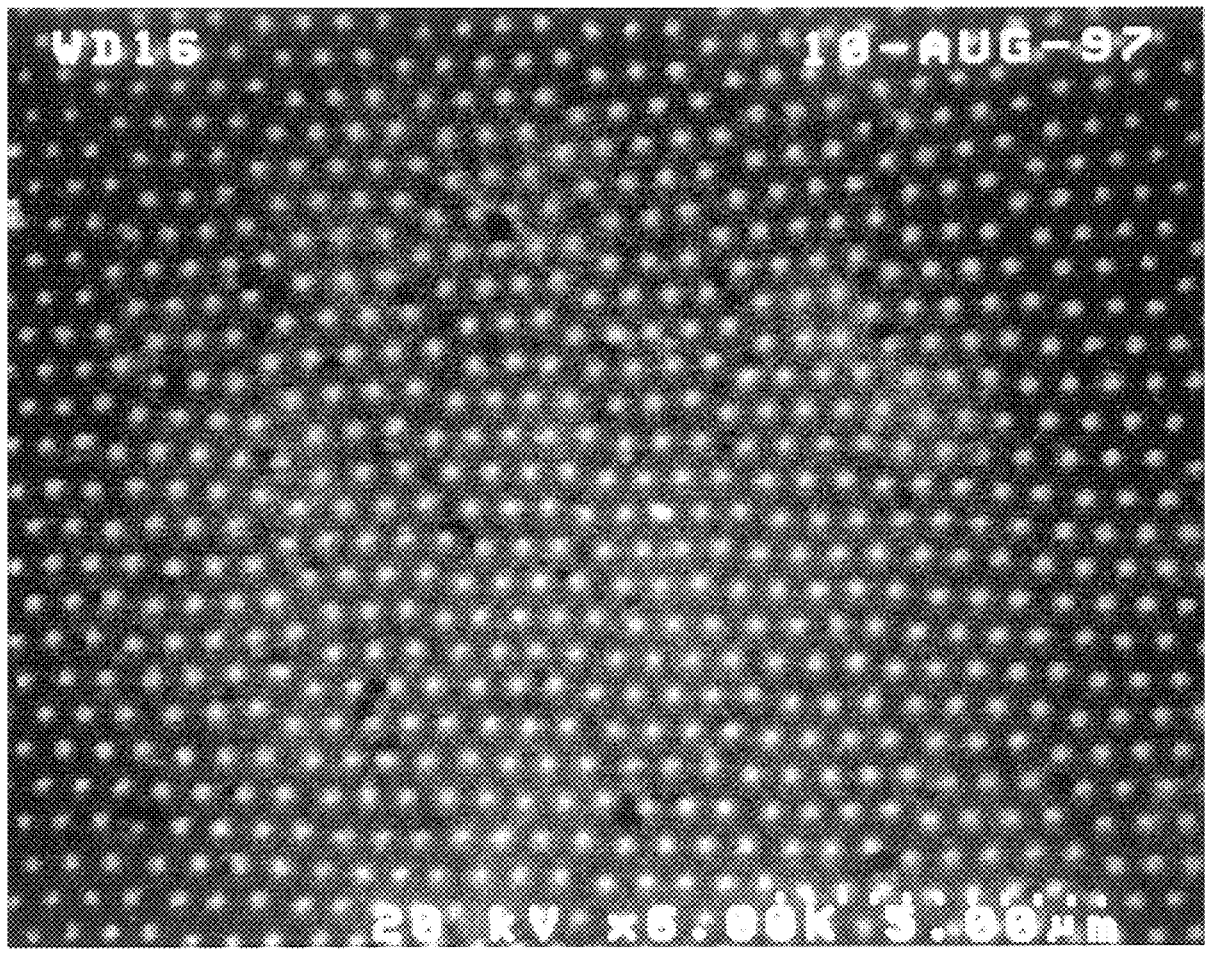
FIG. 10A is an electron micrograph, taken by a scanning electron microscope (SEM), of the sampling end of an exemplary subwavelength-resolution optical imaging device of the present invention, at a magnification of 6,000×.
Figure 10B:
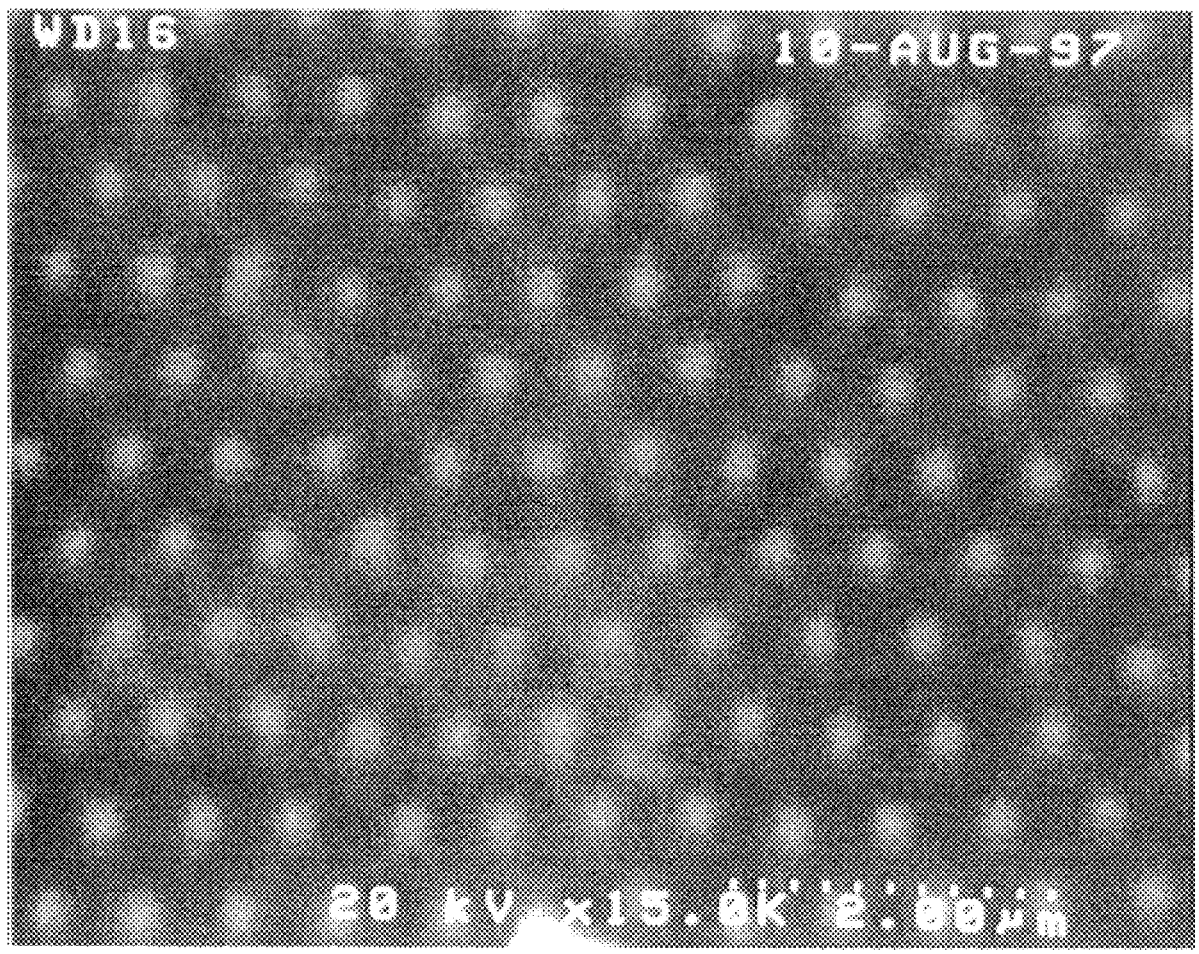
FIG. 10B is an electron micrograph, taken by a scanning electron microscope (SEM), of the sampling end of an exemplary subwavelength-resolution optical imaging device of the present invention, at a magnification of 15,000×.
Figure 10C:
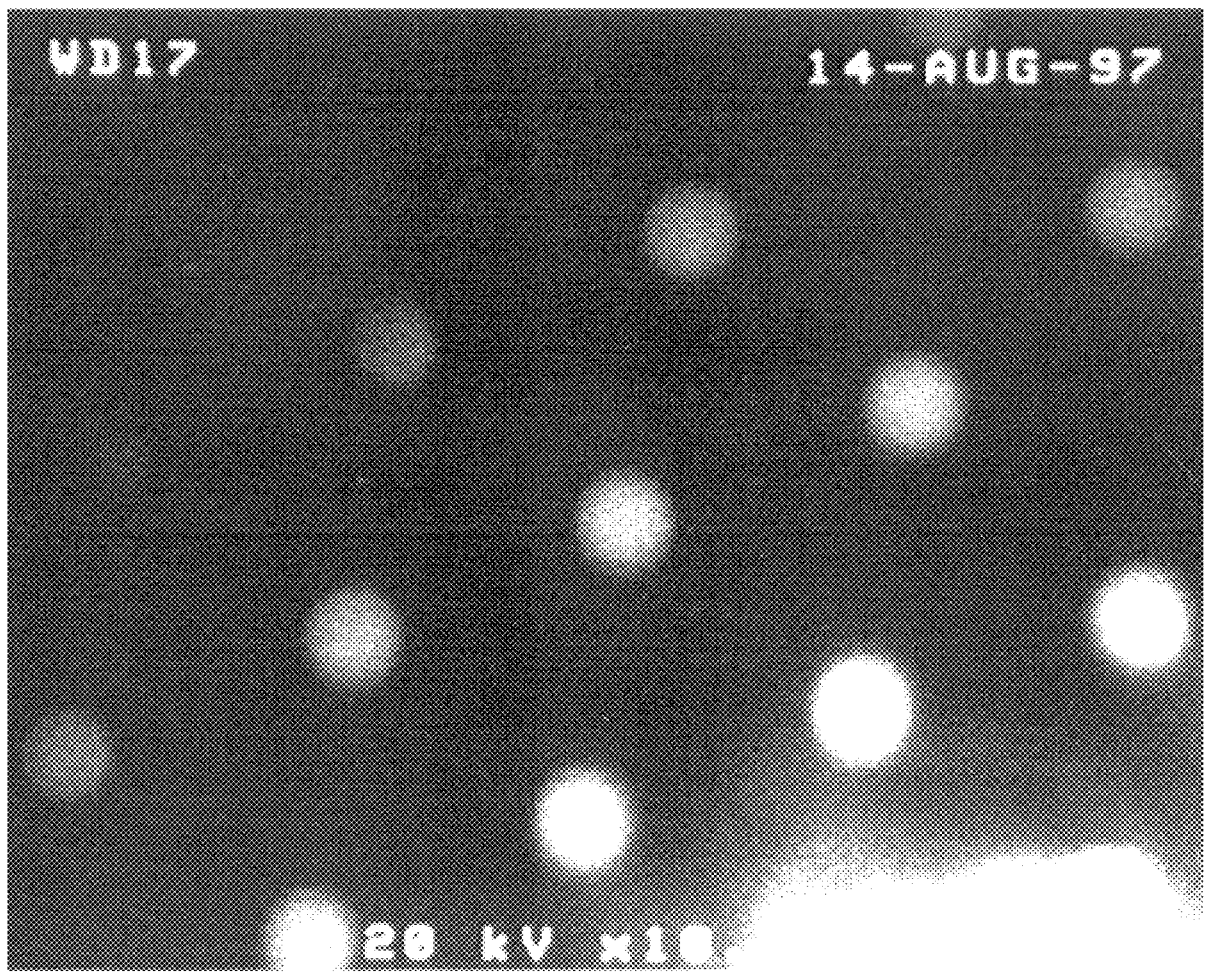
FIG. 10C is an electron micrograph, taken by a scanning electron microscope (SEM), of the observation end of an exemplary subwavelength-resolution optical imaging device of the present invention, at a magnification of 10,000×.
Figure 10D:
FIG. 10D is an electron micrograph, taken by a scanning electron microscope (SEM), of the observation end of an exemplary subwavelength-resolution optical imaging device of the present invention, at a magnification of 30,000×.
Figure 11:
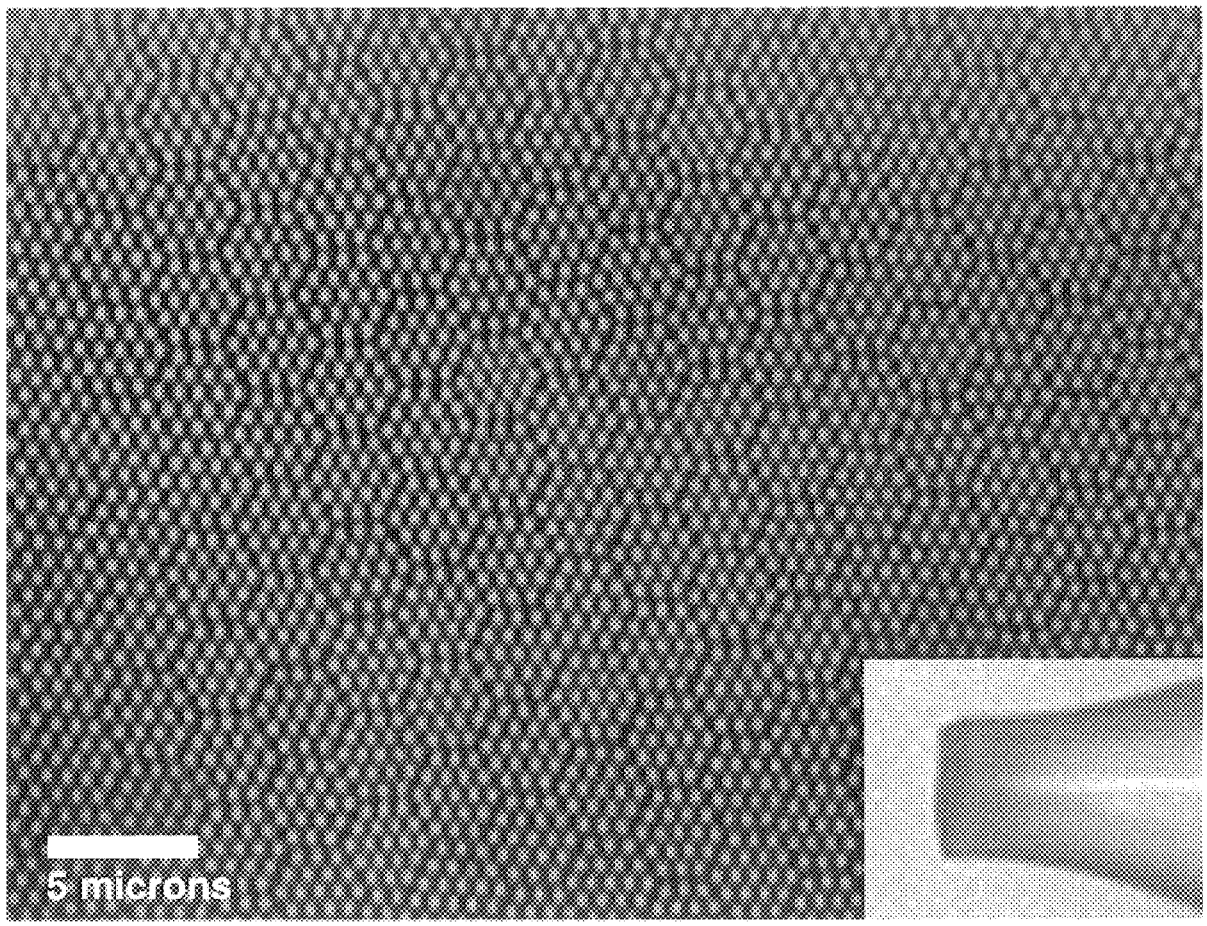
FIG. 11 is a far-field, transmitted white light image through the tapered end of the exemplary subwavelength-resolution optical imaging device shown in FIGS. 10A and 10B, together with an inset magnified photograph taken by a CCD camera showing the cleaved end of the coherent fiber bundle comprising the exemplary subwavelength-resolution optical imaging device.

Reference is now made to FIGS. 10 and 11, which show an exemplary implementation of an imaging bundle of the present invention. The imaging bundle shown in these figures exhibits a value of $\Delta \cong 1.00$, which is significantly larger than prior art coherent bundles which are typically manufactured with a value of $\Delta \cong 0.55$. The original bundle (prior to tapering) is made from individual fibers with a core diameter of 1 micron and 2 micron "pitch" (or period). The core material is SHOTT glass LAF22 with $n_1=1.78$, and the cladding material is CORNING glass 7052 with $n_2=1.49$. This choice of core/cladding material results in a value of $\Delta=0.974$. The original bundle is heated with a $CO_2$ laser to the melting point of the fibers (which in all exemplary case of quartz fibers is approximately 1050° C.) and pulled to form a taper and is subsequently cleaved along the taper to produce the desired core diameter. Following this procedure, the inventors have produced bundles with core sizes in the range of 250–600 nm at tile tapered, sampling end. The fibers were inspected by an electron microscope to determine core sizes and preliminary optical studies were performed by imaging the transmitted light through the tapered end under a high magnification optical microscope.

FIGS. 10A–10D are electron micrographs of a typical tapered imaging bundle of the present invention constructed as set forth above. FIGS. 10A and 10B show the sampling end of the bundle, while FIGS. 10C and 10D show the observation end of the bundle. As shown in FIGS. 10A and 10B, the individual core diameters are determined to be 250 nm at the sampling end for this imaging bundle. A transmitted white light image through the sampling end of the same bundle is shown in FIG. 11. Although it is not expected that the far-field image of FIG. 11 would resolve 250 nm features, it will be noted from this image that the diffracted light from individual cores is clearly resolved. In addition, confinement of the transmitted light all the way along the tapered portion of each optical fiber is indicated.

Figure 12A:
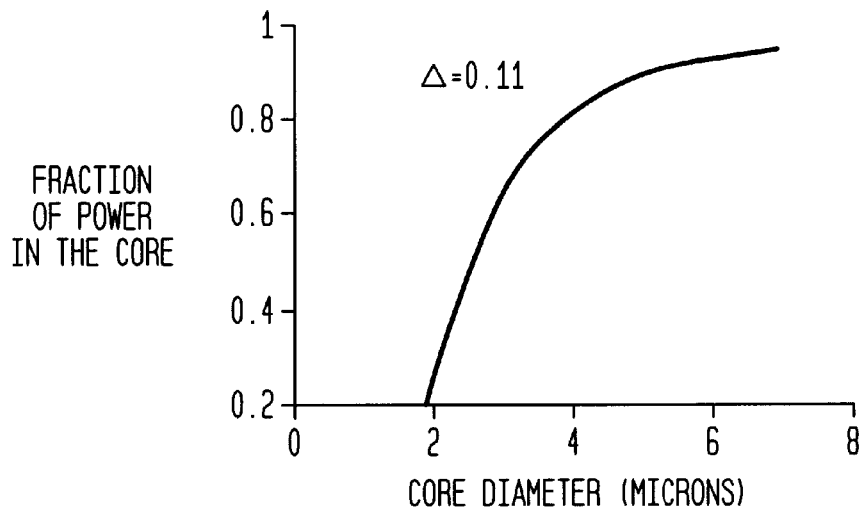
FIGS. 12A is a graph showing the fraction of power in the core of a conventional single mode fiber having a value of $\Delta=0.11$, as a function of core diameter.
Figure 12B:
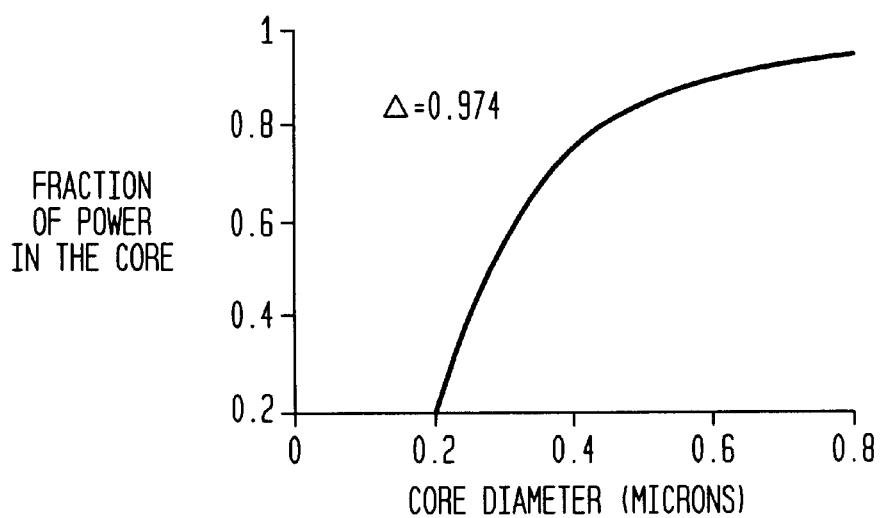
FIG. 12B is a graph showing the fraction of power in the core of an exemplary single mode fiber in an imaging bundle of the present invention having a value of $\Delta=0.974$, as a function of core diameter.

The efficient confinement of light within the core of the preceding exemplary imaging bundle is highlighted by the graphs of FIGS. 12A and 12B. FIG. 12A is a graph showing tile fraction of power in the core of a conventional single mode fiber having a value of Δ=0.11, as a function of core diameter, whereas FIG. 12B is a graph showing the fraction of power in the core of the exemplary single mode fiber in an imaging bundle of the present invention having a value of Δ=0.974. As can be seen, a much higher fraction of power can be confined within the core of the exemplary imaging bundle constructed in accordance with the present invention in comparison to conventional single mode imaging fibers having the same core diameter. Conversely stated, fiber cores in an imaging bundle of the present invention can be made much smaller in diameter while maintaining the same degree of power confinement within the core is compared to conventional fibers. For example, 80% of power can be confined to a fiber core of the present invention having a diameter of only about 0.45 microns as shown in FIG. 12B, while a conventional fiber core would require a diameter of nearly 4 microns to maintain the same level of power confinement as shown in FIG. 12A. Accordingly, by appropriately selecting the values of $n_1$ and $n_2$ to achieve a large value of Δ, an imaging bundle constructed according to the present invention can achieve significant containment of light within each fiber core without creating. crosstalk and without the need for the metallic claddings used in the prior art.

While there has been described and illustrated herein a subwavelength-resolution optical imaging device which provides subwavelength resolution and an enhanced field of view without the need for special materials such as a metallic cladding to efficiently guide light within the device, it will be apparent to those skilled in the art that further variations and modifications are possible without deviating from the broad teachings and spirit of the invention which shall be limited solely by the scope of the claims appended hereto.

What is claimed is:

1. A subwavelength-resolution optical imaging device for conveying light having a wavelength λ emitted, reflected or transmitted by a sample, the device comprising:

a coherent fiber bundle comprising a plurality of optical fibers disposed substantially coaxially along their lengths, each optical fiber having a first optical fiber end and a second optical fiber end, and each optical fiber comprising a core having an index of refraction $n_1$ and a cladding having an index of refraction $n_2$ thereby providing a value Δ, where:

$$\Delta = \sqrt{n_1^2 - n_2^2}$$

and wherein:
the coherent fiber bundle includes an observation end comprising the first optical fiber ends which collectively present an observation end face for at least one of introducing, conveying and emitting the light;
the coherent fiber bundle farther includes a sampling end comprising the second optical fiber ends, each second optical fiber end being of reduced diameter in comparison to the first optical fiber end and tapered to present a sampling end face, the core of each optical fiber at the sampling end face having a cross-sectional diameter which is less than or equal to λ; and
wherein the values of $n_1$ and $n_2$ are selected so as to provide a value for Δ which permits at least a predetermined fraction of the light launched into each optical fiber at the sampling end of the coherent fiber bundle to be conveyed through the optical fiber to the observation end of the coherent fiber bundle and which restricts crosstalk between adjacent optical fibers of the coherent fiber bundle to a predetermined level.

2. The subwavelength-resolution imaging device of claim 1, wherein each optical fiber has a diameter d, and wherein the intensity of light across a cross-section of the core of each fiber is a Gaussian intensity distribution having a width which is determined by the indices of refraction $n_1$ and $n_2$, and wherein the values of $n_1$ and $n_2$ are selected so that the width of the Gaussian intensity distribution is smaller than the diameter d of the core of each optical fiber.

3. The subwavelength-resolution imaging device of claim 2, wherein the crosstalk corresponds to an overlap between the Gaussian intensity distributions in adjacent optical fibers in the coherent fiber bundle, and wherein the crosstalk is restricted to the predetermined level by providing a minimum separation between adjacent optical fibers in the coherent fiber bundle which restricts the overlap between the Gaussian intensity distributions to the predetermined level.

4. The subwavelength-resolution imaging device of claim 1, wherein the values of $n_1$ and $n_2$ are selected so that each optical fiber operates as a single-mode optical fiber.

5. The subwavelength-resolution imaging device of claim 4, wherein each optical fiber has a radius ρ at the sampling end, and wherein each optical fiber exhibits a normalized frequency parameter, V, where:

$$V = 2\pi \frac{\rho}{\lambda} \Delta$$

and wherein the values of $n_1$ and $n_2$ are selected so that, for 2ρ/λ being less than or equal to 1, V is less than or equal to about 2.41.

6. The subwavelength-resolution imaging device of claim 5, wherein the values of $n_1$ and $n_2$ are selected so that V is about 2.41.

7. The subwavelength-resolution imaging device of claim 1, wherein the optical fibers in the coherent fiber bundle are packaged in a rectangular cross-sectional format at at least the observation end and the sampling end.

8. The subwavelength-resolution imaging device of claim 1, wherein the optical fibers in the coherent fiber bundle are packaged in a hexagonal cross-sectional format at at least the observation end and the sampling end.

9. A subwavelength-resolution optical microscopy system for optically observing a sample, the system comprising:

a scan stage for holding the sample;

a microscope having an input and an output, the microscope magnifying a first image of the sample provided at the microscope input to provide a second image of the sample at the microscope output, wherein the second image is magnified with respect to the first image;

a subwavelength-resolution optical imaging device for conveying light having a wavelength λ emitted, reflected or transmitted by the sample held by the scan stage, and providing the first image of the sample to the microscope input, the subwavelength-resolution optical imaging device comprising:

a coherent fiber bundle comprising a plurality of optical fibers disposed substantially coaxially along their lengths, each optical fiber having a first optical fiber end and a second optical fiber end, and each optical fiber comprising a core having an index of refraction $n_1$ and a cladding having an index of refraction $n_2$ thereby providing a value $\Delta$, where:

$$\Delta = \sqrt{n_1^2 - n_2^2}$$

and wherein:

the coherent fiber bundle includes an observation end proximate the sample, the observation end comprising the first optical fiber ends which collectively present an observation end face for at least one of introducing, conveying and emitting the light;

the coherent fiber bundle further includes a sampling end optically coupled to the input of the microscope, the sampling end comprising the second optical fiber ends, each second optical fiber end being of reduced diameter in comparison to the first optical fiber end and tapered to present a sampling end face, the core of each optical fiber at the sampling end face having a cross-sectional diameter which is less than or equal to $\lambda$; and wherein the values of $n_1$ and $n_2$ are selected so as to provide a value for $\Delta$ which permits at least a predetermined fraction of the light launched into each optical fiber at the sampling end of the coherent fiber bundle to be conveyed through the optical fiber to the observation end of the coherent fiber bundle and which restricts crosstalk between adjacent optical fibers of the coherent fiber bundle to a predetermined level.

10. The subwavelength-resolution optical microscopy system of claim 9, wherein each optical fiber has a diameter d, and wherein the intensity of light across a cross-section of the core of each fiber is a Gaussian intensity distribution having a width which is determined by the indices of refraction $n_1$ and $n_2$, and wherein the values of $n_1$ and $n_2$ are selected so that the width of the Gaussian intensity distribution is smaller than the diameter d of the core of each optical fiber.

11. The subwavelength-resolution optical microscopy system of claim 10, wherein the crosstalk corresponds to an overlap between the Gaussian intensity distributions in adjacent optical fibers in the coherent fiber bundle, and wherein the crosstalk is restricted to the predetermined level by providing a minimum separation between adjacent optical fibers in the coherent fiber bundle which restricts the overlap between the Gaussian intensity distributions to the predetermined level.

12. The subwavelength-resolution optical microscopy system of claim 9, wherein the values of $n_1$ and $n_2$ are selected so that each optical fiber operates as a single-mode optical fiber.

13. The subwavelength-resolution optical microscopy system of claim 12, wherein each optical fiber has a radius $\rho$ at the sampling end, and wherein each optical fiber exhibits i normalized frequency parameter, V, where:

$$V = 2\pi \frac{\rho}{\lambda} \Delta$$

and wherein the values of $n_1$ and $n_2$ are selected so that, for $2\rho/\lambda$ being less than or equal to 1, V is less than or equal to about 2.41.

14. The subwavelength-resolution optical microscopy system of claim 13, wherein the values of $n_1$ and $n_2$ are selected so that V is about 2.41.

15. The subwavelength-resolution optical microscopy system of claim 9, wherein the optical fibers in the coherent fiber bundle are packaged in a rectangular cross-sectional format at at least the observation end and the sampling end.

16. The subwavelength-resolution optical microscopy system of claim 9, wherein the optical fibers in the coherent fiber bundle are packaged in a hexagonal cross-sectional format at at least the observation end and the sampling end.

17. The subwavelength-resolution optical microscopy system of claim 9, further comprising a monitor, the monitor having an input, wherein the monitor input is coupled to the microscope output so that the monitor visually displays the second, magnified image provided at the microscope output.

18. The subwavelength-resolution optical microscopy system of claim 9, further comprising a camera, the camera having an input and an output, wherein the camera input is coupled to the microscope output so that the camera captures the second, magnified image provided at the microscope output.

19. The subwavelength-resolution optical microscopy system of claim 18, further comprising a monitor, the monitor having an input, wherein the monitor input is coupled to the camera output so that the monitor visually displays the second, magnified image captured by the camera from the microscope output.

* * * * *